April 21, 1953

A. YORGIADIS 2,635,472

RECIPROCATING MACHINE

Filed Nov. 2, 1948

INVENTOR.
Alexander Yorgiadis

BY *Van Deventer & Shively*
ATTORNEYS

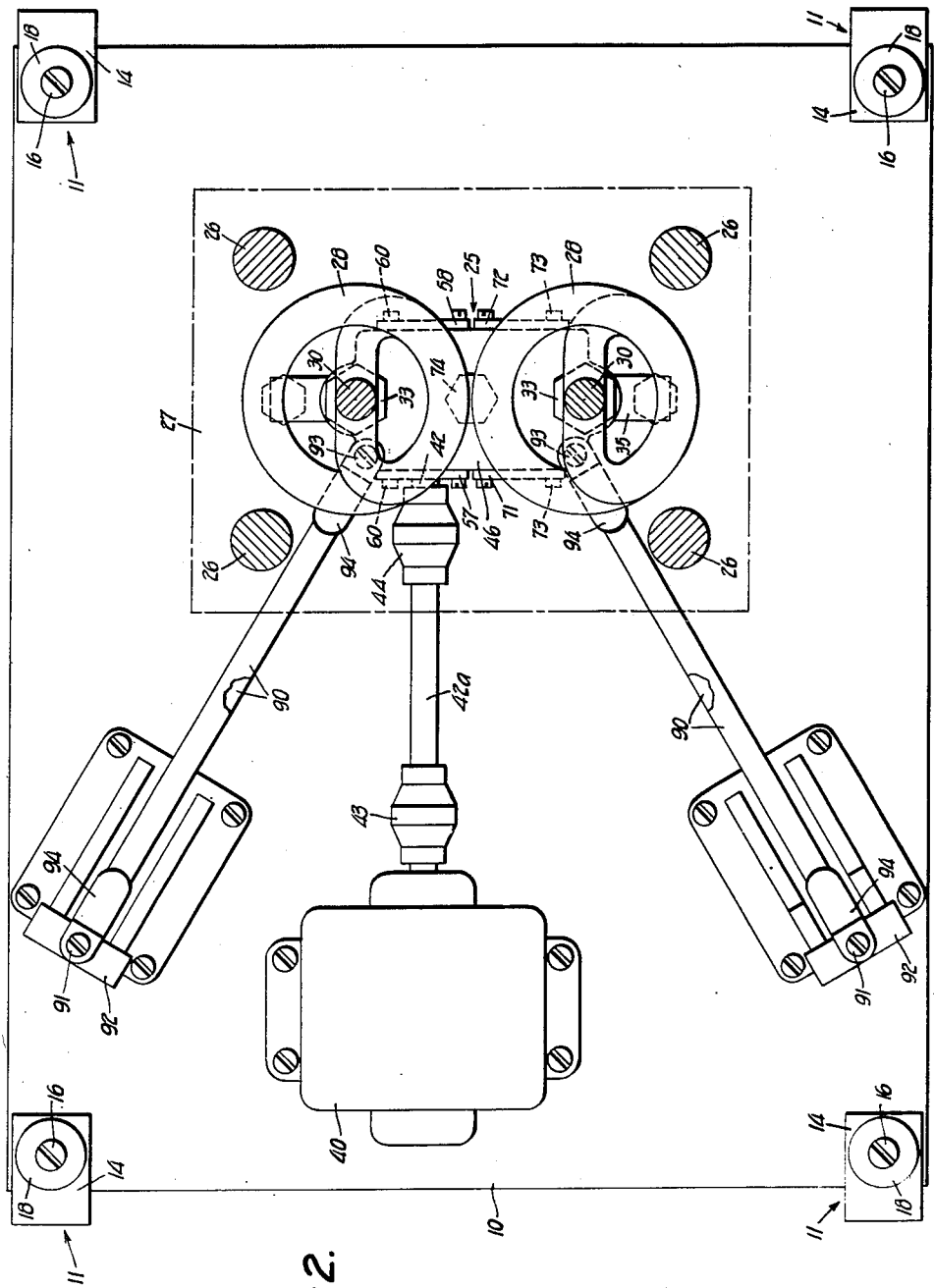

April 21, 1953  A. YORGIADIS  2,635,472
RECIPROCATING MACHINE
Filed Nov. 2, 1948  3 Sheets-Sheet 3
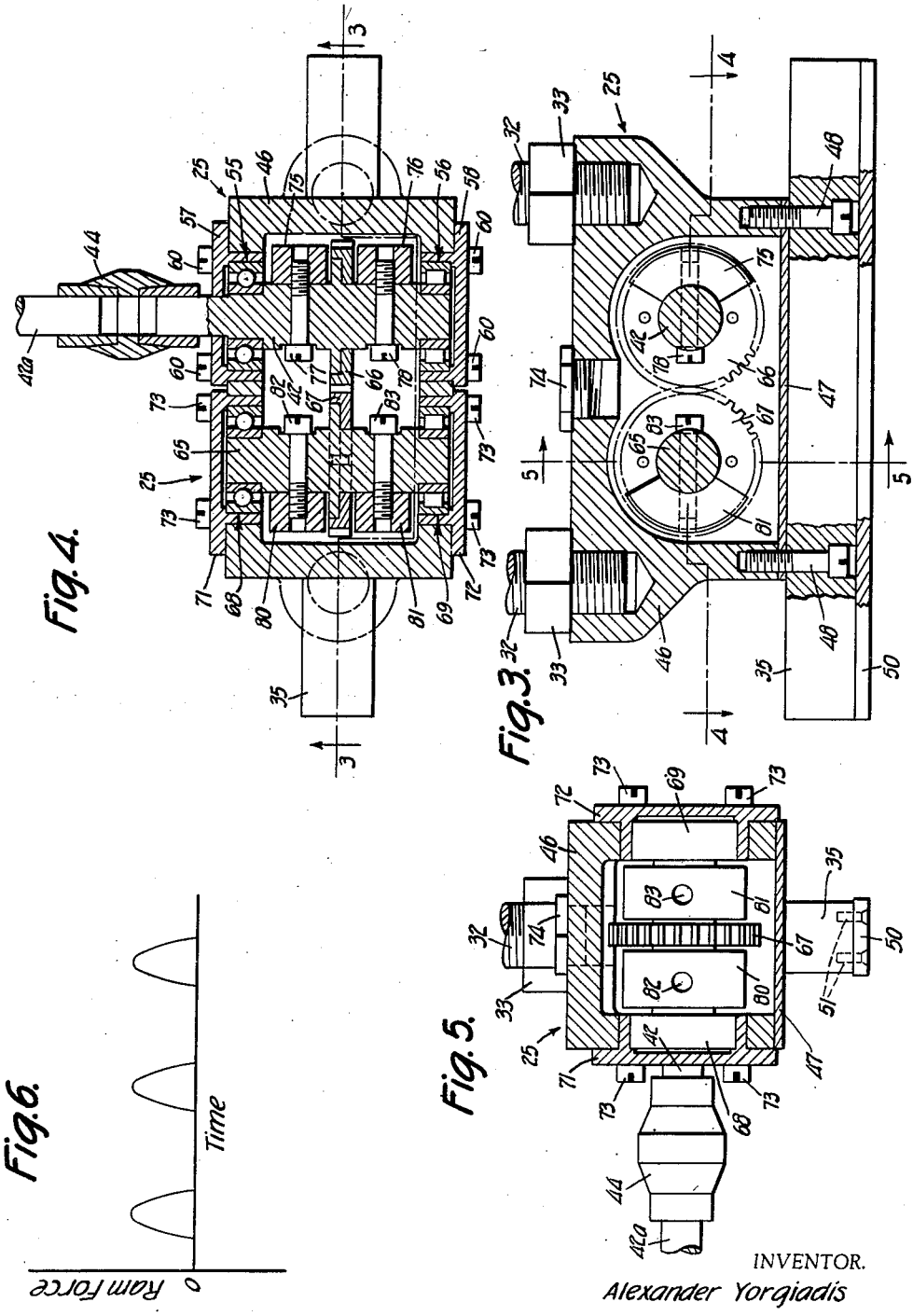
INVENTOR.
Alexander Yorgiadis
BY Van Deventer & Shively
ATTORNEYS Patented Apr. 21, 1953

2,635,472

UNITED STATES PATENT OFFICE 2,635,472

RECIPROCATING MACHINE

Alexander Yorgiadis, Liverpool, N. Y.

Application November 2, 1948, Serial No. 57,893

5 Claims. (Cl. 74—61)

The present invention relates to improvements in that type of automatic machine in which a reciprocating head is made to perform repeated operations, such as cutting, chopping, crushing, punching, scoring, shaping, stamping and the like, on metal, wood, paper, plastic or other materials.

Hitherto, reciprocating machines of the general type referred to have been limited in speed principally because of wear problems.

Among the objects of the present invention is to provide a new and improved reciprocating machine of the general type referred to, which can be operated faster, easier, and with less wear and less expenditure of input energy than has hitherto been possible with machines employing cams, hydraulic rams, cranks, etc.

In accordance with certain features of the present invention, the machine has a spring mounted vibratory head, and the resulting mass-spring mechanical system is designed for a natural frequency of vibration close to the normal operating speed of said head. The mechanical or electrical power drive device for operating the machine is adapted to oscillate the head at a frequency close to the natural frequency of the mass-spring mechanical system, so that said system is excited into resonance vibration. Because of this substantially resonant operating condition, the force with which the oscillatory head operates is much greater than the force applied thereto by the drive device. As a result, the bearings and other parts of the machine subject to wear are lightly loaded, in contrast with those in existing reciprocating machines of the cam, crank or hydraulic type, so that the power absorbed in the machine in overcoming frictional forces is comparatively low, and the wear on the parts materially reduced. Furthermore, the size of the machine can be materially reduced in comparison with prior art machines.

Various other objects, features and advantages of the invention will be apparent from the following particular description, and from an inspection of the accompanying drawings, in which:

Fig. 2 is a horizontal section of the resonance vibratory machine taken on line 2—2 of Fig. 1;

Fig. 3 is a vertical section taken on line 3—3 of Fig. 4 of the vibratory head forming part of the resonance vibratory machine of the present invention;

Fig. 4 is a horizontal section of the vibratory head taken on line 4—4 of Fig. 3;

Fig. 5 is a vertical section of the vibratory head of the machine taken on line 5—5 of Fig. 3; and Fig. 6 is a curve showing the applying force of the ram in relation to time, in accordance with the principles of the present invention.

Figure 1:
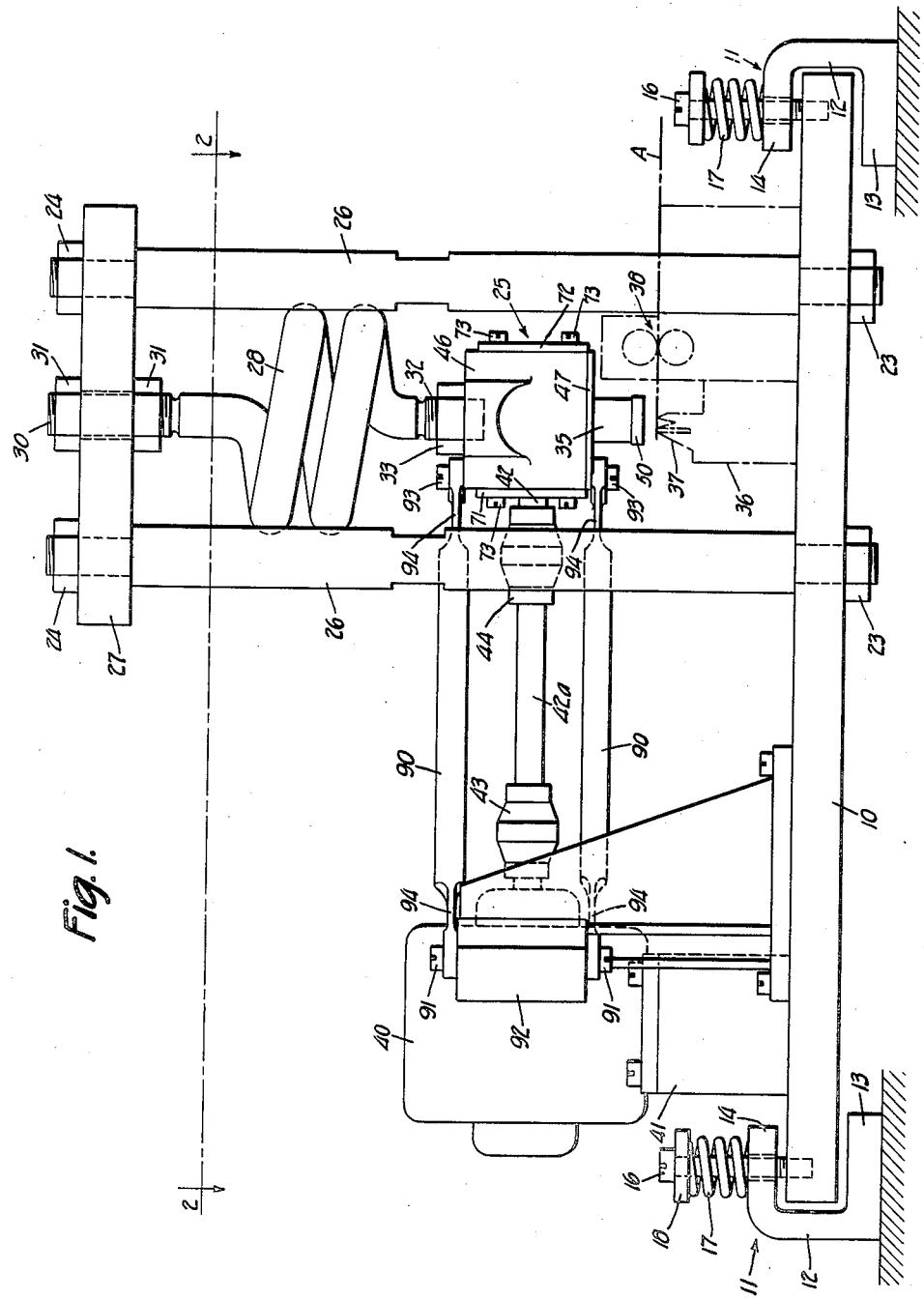
Fig. 1 is a side elevation of a resonance vibratory machine embodying features of the present invention.

Referring to the drawings, the resonance vibratory machine of the present invention is shown of the type in which a ram is reciprocated to effect repeated operations, such as cutting, chopping, crushing, punching, scoring, shaping, stamping and the like. More specifically, the machine is shown of the tye in which a sheet material A is cut into successive sections after being fed intermittently into the field of operation of the ram, as will be more fully described.

The machine is mounted on a heavy base plate 10 connected to the floor through soft spring mounts 11, so that vibrations from the machine are not transmitted to the floor. Each of these spring mounts 11 comprises a U-shaped bracket 12 having a base flange 13 resting on the floor, and having a top flange 14 defining with said base flange a recess into which a respective section of the base plate 10 near a corner extends with clearance above and below it to permit vertical vibratory movement of said base plate. A cap screw 16 is threaded at its lower end in the base plate 10, and extends with a loose fit into a hole in the upper bracket flange 14. A coil spring 17 encircling the cap screw 16 bears at its lower end against the top bracket flange 14, and at its upper end against a collar 18 on said cap screw.

The machine has a ram carrying vibratory head 25 spring mounted on a frame structure comprising a series of columns or posts 26, four of these being shown fastened at their lower ends to the base plate 10 by nuts 23, and secured at their upper end by nuts 24 to a horizontal frame plate 27. A system of springs 28 is provided for elastically supporting the vibratory head 25 from the frame plate 27. This system of springs 28 is shown comprising two strong coil springs secured at their upper ends to the fixed frame plate 27, and at their lower free ends to the vibratory head 25. The coil springs 28 have their upper ends 30 threaded and secured to the frame plate 27 by means of nuts 31, and their lower ends 32 threaded into the top of the casing of the vibratory head 25 at spaced sections thereof, and retained therein by means of respective lock nuts 33.

The vibratory head 25 has a hammer or ram 35 at its lower end, which is adapted to be moved alternately into and out of cooperation with an anvil or bed 36 fixed to the base plate 10. This anvil 36 is shown with a set of cutters 37 of any suitable type, over which a sheet of material A may be fed intermittently through a feed device 38. The ram 35 is reciprocated in the manner to be described, to cut the stock material A into sections.

The head 25 is a mechanical oscillator or vibrator of the centrifugal force type, and is operated from a variable speed electric motor 40, which is rigidly secured to a support 41 fixed to the base plate 10. The shaft of the electric motor 40 drives shaft 42, one of the two shafts of the oscillator, through two flexible couplings 43 and 44 which are connected by an intermediate shaft 42a. The flexible couplings are needed in order to allow the oscillator to vibrate freely while driven from the stationary motor 40.

The oscillator head 25 comprises a casing 46 closed at the bottom by a removable cover plate 47 fixed thereto by means of cap screws 48, and carries the ram or hammer 35 at the bottom thereof by means of said cap screws threaded into the side walls of the oscillator head casing 46. A wear plate or lining 50 is removably secured to the lower side of the ram 35 by means of screws 51.

The oscillator shaft 42 is supported in casing 46 by bearings 55 and 56 mounted on bearing caps 57 and 58 respectively, affixed to the sides of said casing by head screws 60. The shaft 42 drives a stub or countershaft 65 in the oscillator head casing 46 at the same peripheral speed, but in the opposite direction, by means of a pair of meshing spur gears 66 and 67 secured to said shafts respectively. The stub shaft 65 is supported in bearings 68 and 69 mounted in bearing caps 71 and 72 respectively, affixed to the sides of the oscillator head casing 46 by means of cap screws 73.

To permit easy access to the interior of the head casing 46, as for example, for lubricating purposes, the top of said casing has a hole closed by a screw plug 74.

To create vibratory oscillations in the head 25, the oscillator shaft 42 carries in the casing 46 a pair of centrifugal eccentric weights 75 and 76, mounted in axial alignment on opposite sides of the gear 66, and secured to said shaft by means of respective cap screws 77 and 78. These cap screws 77 and 78 extend radially through the shaft 42, and are threaded at their outer ends into respective weights 75 and 76.

The stub shaft 65 also carries a pair of axially aligned eccentric centrifugal weights 80 and 81 adjustably mounted on said shaft on opposite sides of the gear 67 by respective radial cap screws 82 and 83, and disposed symmetrically with respect to the weights 75 and 76 on the shaft 42.

As the two symmetrical sets of eccentric weights 75, 76 and 80, 81 rotate in opposite directions at the same rotative speed, the horizontal components of the centrifugal forces produced by these two sets of weights cancel each other, while the vertical components add up and are transmitted to the head 25 in a direction to cause vertical oscillation of said head.

In order to maintain the oscillating masses resulting from the head 25 and its attached ram 35 in a substantially linear vertical path, and to eliminate side displacements of said head, which have no effective, useful function, the head is confined in its operating motion by a plurality of comparatively long flexible arms 90, arranged in two angular sets on opposite sides of the motor 40 and motor shaft 42a. The arms 90 of each set are arranged in parallel superposed relationship, and are connected at one end by cap screws 91 to a fixed frame 92 forming part of a bracket fixed to the base plate 10. At the other end, the arms 90 are secured to the top and bottom of the oscillator head 25 respectively by means of cap screws 93.

The arms 90 are shown in the form of metal rods having reduced plate sections 94 near their ends to render them flexible at said sections. The flexible arms 90 arranged and mounted as shown, serve to guide the oscillator head 25 in the desired substantially vertical direction, eliminate movement in other directions, and prevent rotation and angular oscillations.

As a feature of the present invention, the stiffness or strength of the springs 28 and the mass of the vibrating parts 25, 35 are such, that the natural frequency of free vibration of the system is slightly above the normal operating frequency. The oscillator head 25 is adapted to be operated at a frequency which is substantially the same as the natural frequency of the vibrating mass of the system, so that the system is excited into resonance vibrations by the mechanical oscillator head 25. Because of this substantially resonant condition, the available operating force at the ram or head 35 is several times the force required to actuate the oscillator 25.

To explain the principle of operation, it is desirable to refer to the basic principles of mechanical vibrations. When a weight or mass is fastened to the free end of a spring and allowed to vibrate freely, the frequency of the oscillations or the number of complete cycles the mass will make in unit time depends only on the size of the vibrating mass and the rigidity of the spring. The relationship for this natural frequency is the well-known formula:

$$f_n = \frac{1}{2\pi}\sqrt{\frac{Kg}{W}}$$

where $f_n$ = natural frequency, cycles per second,
$K$ = rigidity of spring, lbs. of force required to cause one inch deflection,
$W$ = weight of the body at the end of spring, lbs.,
$g$ = acceleration due to gravity, 386 inches per sec.$^2$.

Consider the same mass-spring system excited by a centrifugal force mechanical oscillator, such as the oscillatory head 25 described. The exciting force of this oscillator varies sinusoidally with time, according to the relationship:

$$F = F_0 \sin 2\pi ft$$

where
$F$ = force at any instant, lbs,
$F_0$ = max. force, or force amplitude, lbs,
$f$ = frequency, cycles per second,
$t$ = time, seconds.

The mass vibrates at the same frequency as the exciting force, not at its natural frequency.

At the very low speeds, the so-called "inertia forces" produced by the reciprocating movement of the mass W are small, so that the force of the oscillator is the main one counteracted by the spring. As the frequency of the exciting force is increased, the intertia produced by the vibration of the mass W also increases. This inertia force acts in the same direction as the exciting force $F_0$, so that the force $F_s$ in the spring which has to stand both of these, increases until it becomes several times the value of $F_0$. The ratio $F_s$ (spring force) to $F_0$ (oscillator force) is the so-called "amplification factor" of the system, which depends on the frequency of operation. This amplification factor may be represented as follows:

$$A.\ F. = \frac{F_s}{F_0} = \frac{1}{1 - f^2/f_n^2}$$

As the exciting frequency $(f)$ approaches the natural frequency $(f_n)$, the amplification factor increases very rapidly, and for a theoretical undamped system, reaches an infinite value. Actually, the various frictional losses and damping reduce this to a finite value of, say, 50 or 100, but this value may reach up to 500 or 1,000 for elastic systems with very little damping. This condition of operating a vibrating system in the vicinity of its natural frequency is known as "resonance." Beyond resonance, the amplification factor falls off as the inertia forces of mass W oppose the exciting force $F_0$.

By operating the elastic system near the natural frequency of vibration, a small exciting vibratory force can be made to produce large vibratory forces in the spring and build a large supply of mechanical energy that is alternately stored and released.

Where an elastic member is rigidly attached between the oscillator head 25 and the stationary frame, the forces applied to said member in relation to time are sinusoidal. This is not the operating arrangement contemplated by the present invention. In accordance with the present invention, the load or parts of the machine receiving the repeated force of the oscillator head 25 are not held rigidly between the stationary and vibrating parts of the machine. Therefore, the energy accumulated during one part of the cycle is released suddenly in the form of a violent or percussive blow, to cut, chop, form, etc. the material to be operated. The force released would be several times as large as the input oscillator force.

In Fig. 6, is shown the operating forces of the ram or hammer 35 created in relation to time, in accordance with the present invention. It should be noted from the graph that large, almost instantaneous forces, are intermittently released at the time they are to be employed for cutting, forming or other similar operations.

In the operation of the machine of the present invention, as the motor 40 is operated at a speed conforming substantially with the natural frequency of vibration of the vibrating mass, the force applied by said motor to the oscillator head 25 causes said head to vibrate substantially vertically, and this causes the ram 35 to strike the material A intermittent percussive blows.

Although the operation performed by the machine is illustrated and described as being a cutting one, it must be understood that as far as certain aspects of the invention are concerned, the operation may be of any other character, such as chopping crushing, punching, scoring, shaping, stamping and the like.

As many changes can be made in the above method and machine, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. In a machine having a ram for operating on a material, in combination, an oscillatory head secured to said ram, spring supporting means rigidly secured to said head and having high strength relative to the weight of said head and ram, whereby said head and ram may normally be freely retained substantially in elastically neutral position with said spring means substantially unflexed, said spring means being yieldable alternately in tension and compression to permit oscillatory movement of said head and ram into operating position to apply effective force to said material and out of said operating position, said head, ram and spring means comprising a unitary mass-spring system of predetermined resonant vibrational frequency, means to excite said head to vibration at a frequency substantially equal to said predetermined frequency to establish resonant vibration thereof, whereby said applied effective force may comprise the force of said exciting means increased by the resonant factor of amplification of said spring means, and flexible means independent of said spring supporting means for laterally confining the movement of said oscillatory head in a direction towards and away from said material.

2. In a machine having a ram for operating on a material at a predetermined speed, in combination, an oscillatory head secured to said ram, spring supporting means secured to said head and having high strength relative to the weight of said head and ram whereby said head and ram may normally be freely retained substantially in elastically neutral position, said spring means being yieldable alternately in tension and compression to permit oscillatory movement of said head and ram alternately into operating position to apply their force to said material and out of said operating force applying position, said spring means being of such rigidity and the oscillatory parts of said machine having such a mass, that the natural frequency of vibration of the oscillatory system is substantially equal to said predetermined operating speed of said machine, means for exciting said head at a frequency substantially equal to said natural frequency of vibration to effect resonantly said oscillatory movement, and means for confining the movement of said oscillatory head to a direction towards and away from said material, said confining means comprising a plurality of flexible arms secured at one end to fixed anchorage points and attached at their other ends to said oscillatory head.

3. In a machine having a ram for operating on a material at a predetermined speed, in combination, an oscillatory head secured to said ram, spring supporting means secured to said head and having high strength relative to the weight of said head and ram whereby said head and ram may normally be freely retained substantially in elastically neutral position, said spring means being yieldable alternately in tension and compression to permit oscillatory movement of said head and ram alternately into operating position to apply their force to said material and out of said operating force applying position, said spring means being of such rigidity and the oscillatory parts of said machine having such a mass, that the natural frequency of vibration of the oscillatory system is substantially equal to said predetermined operating speed of said machine, means for exciting said head at a frequency substantially equal to said natural frequency of vibration to effect resonantly said oscillatory movement, and means for confining the movement of said oscillatory head to a direction towards and away from said material, said confining means comprising a plurality of arms secured at one end to fixed anchorage points and attached at their other ends to said oscillatory head, each of said arms having a reduced plate-like section near each end to render said arms flexible.

4. In a machine having a ram for operating on a material at a predetermined speed, in combination, an oscillatory head secured to said ram, spring supporting means secured to said head and having high strength relative to the weight of said head and ram whereby said head and ram may normally be freely retained substantially in elastically neutral position, said spring means being yieldable alternately in tension and compression to permit oscillatory movement of said head and ram alternately into operating position to apply their force to said material and out of said operating force position, said spring means being of such rigidity and the oscillatory parts of said machine having such a mass, that the natural frequency of vibration of the oscillatory system is substantially equal to said predetermined operating speed of said machine, means including an electric motor having a drive connection to said head for exciting said head at a frequency substantially equal to said natural frequency of vibration to effect resonantly said oscillatory movement, and two sets of flexible arms on opposite sides of said motor secured at one end to fixed anchorage points and attached at their other ends to said oscillatory head, to confine the movement of said oscillatory head in a direction toward and away from said material.

5. In a machine having a ram for operating on a material, in combination, an oscillatory head secured to said ram, spring means of high strength relative to the weight of said head and ram, said spring means being rigidly secured to said head and elastically and freely suspending said head and ram from a fixed frame part, whereby said head and ram are permitted to oscillate substantially vertically and alternately into operating position to apply force to said material and out of said operating force applying position, means controllable to excite said head for oscillation substantially at the resonant frequency of the mass-spring system comprising said ram, head and spring means, and means for confining said head to said oscillating movement in said substantially vertical direction, said confining means comprising flexible rods anchored to fixed points at one end, and attached at their other ends to said head.

ALEXANDER YORGIADIS.

References Cited in the file of this patent

UNITED STATES PATENTS

| Number | Name | Date |
|---|---|---|
| 1,323,222 | Johnston | Nov. 25, 1919 |
| 1,386,329 | Goldschmidt | Aug. 2, 1921 |
| 1,672,807 | Etzel | June 5, 1928 |
| 1,721,429 | Bowman | July 16, 1929 |
| 2,153,243 | Flint | Apr. 4, 1939 |
| 2,200,724 | Robins | May 14, 1940 |
| 2,238,116 | Kelly | Apr. 15, 1941 |
| 2,312,477 | Pollitz | Mar. 2, 1943 |
| 2,403,502 | Cook | July 9, 1946 |
| 2,436,251 | Dobie et al. | Feb. 17, 1948 |